United States Patent [19]

Martellock et al.

[11] Patent Number: 4,685,024
[45] Date of Patent: Aug. 4, 1987

[54] OVERCURRENT CIRCUIT INTERRUPTER USING RMS SAMPLING

[75] Inventors: Paul T. Martellock, Syracuse, N.Y.; John J. Dougherty, Avon; Nora A. Lund, Canton, both of Conn.

[73] Assignee: General Electric Company, New York, N.Y.

[21] Appl. No.: 799,603

[22] Filed: Nov. 19, 1985

[51] Int. Cl.[4] .............................................. H02H 3/27
[52] U.S. Cl. ...................................... 361/93; 361/96; 361/86
[58] Field of Search ........................ 361/86, 91, 93–96

[56] References Cited

U.S. PATENT DOCUMENTS 3,633,073  1/1972  Day et al. ......................... 361/95 X
4,276,605  6/1981  Okanoto et al. ..................... 364/483

Primary Examiner—A. D. Pellinen
Assistant Examiner—Todd E. DeBoer
Attorney, Agent, or Firm—Richard A. Menelly; Walter C. Bernkopf; Fred Jacob

[57] ABSTRACT

An electronic overcurrent circuit interrupter utilizes a digital processor for performing RMS sampling of circuit current for comparison to stored long time and short time current values and time delays before tripping the breaker. A magnetic core current transformer is employed for providing an output current signal to the digital processor. Upon detecting core saturation, which occurs at high currents, an analog detection circuit interrupts the RMS sampling and causes the digital processor to time out the shortest pre-selected time delay before tripping the breaker.

3 Claims, 6 Drawing Figures

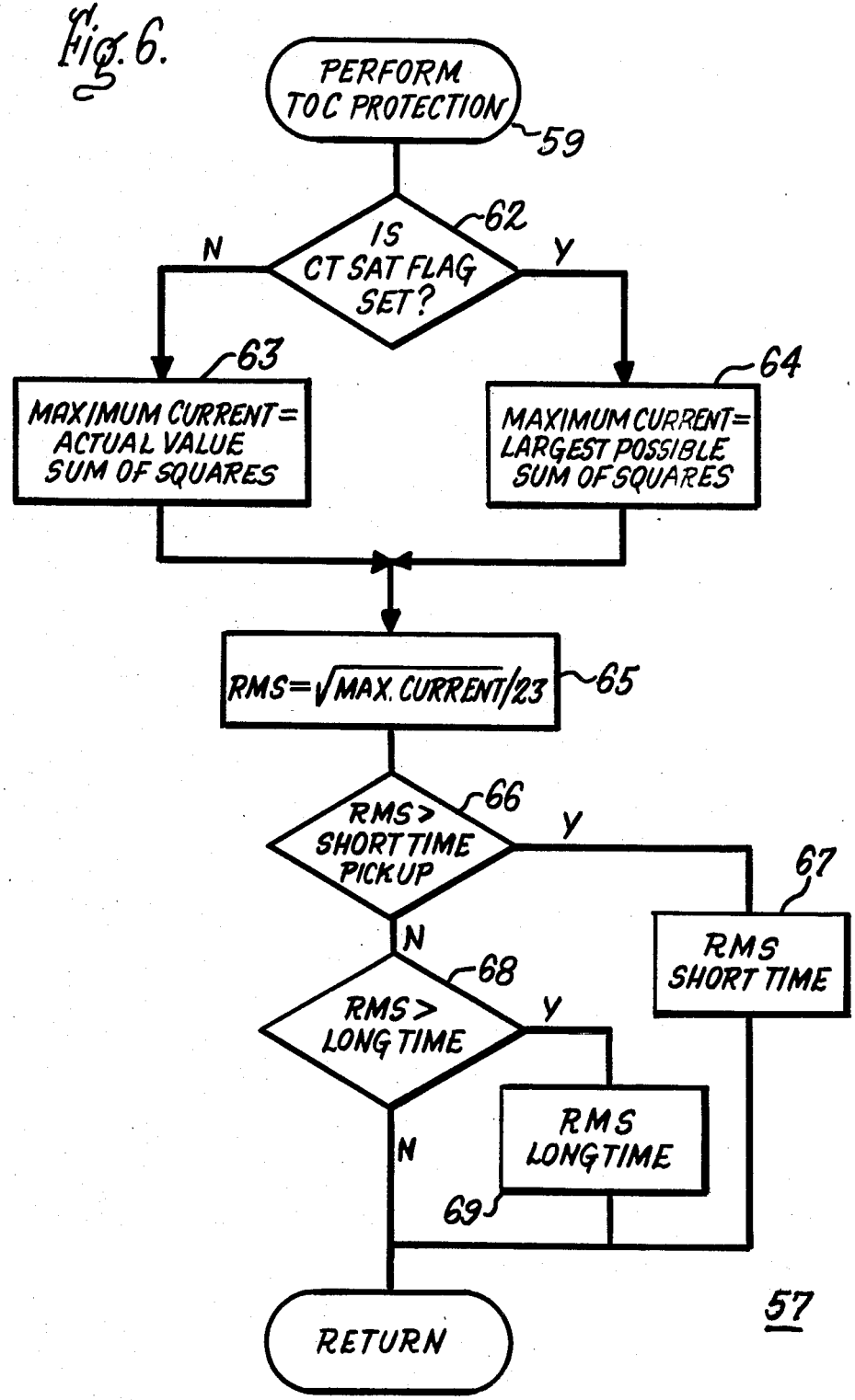

OVERCURRENT CIRCUIT INTERRUPTER USING RMS SAMPLING

BACKGROUND OF THE INVENTION

Electronic circuit interruption devices are currently available that employ digital circuit logic for determining overcurrent conditions and for interrupting a protected circuit when such overcurrent conditions persist for predetermined time intervals. U.S. patent application Ser. No. 626,341, filed June 29, 1984 entitled "Circuit Breaker And Protective Relay Unit" describes one such interrupter and is incorporated herein for purposes of reference. Current transformers are arranged for sensing circuit current through each of the 3-phases of an industrial power system. The transformer secondary currents are continuously sampled within a digital processor to determine the maximum RMS current within each of the 3-phases at any given time. As is well-known in the circuit protection industry, the time overcurrent parameters for interruption are based on the heating affects on the various conductors used throughout the power system. The long time overcurrent condition is believed to be related to the heating of the power bus conductors and some time is allowed for this overcurrent condition to exist before the circuit is interrupted. The short time overcurrent condition is believed to be related to the heating of the electrical junctions between the power bus conductors. Since the so called "contact resistance" at these junctions increases rapidly with increases in temperature the overcurrent condition should be interrupted in a shorter period of time. Finally, the high overcurrent situation caused by a short circuit fault should be interrupted as soon as the fault condition is sensed. This overcurrent duration is described as instantaneous with respect to the long and short time overcurrent delays before circuit interruption is initiated. The current transformers used for sensing current through the protected circuit employ magnetic cores that saturate at high fault current conditions. Although the peak values of current can be accurately determined after current transformer core saturation, the measured RMS current necessary for accurate RMS determination decreases as the true RMS current continues to increase. The peak value of sensed current should be analyzed by the digital processor after current transformer core saturation has occurred therefore, to ensure accurate overcurrent determination. Since peak determination of overcurrent conditions is an approximation of the actual RMS current value, based on the mathematical relation between the peak and RMS current values, peak current determination is less accurate for the long and short time overcurrent determinations and could result in so-called "nuisance" tripping. This affect is described within U.S. patent application Ser. No. 743,337, filed June 10, 1985 and entitled "Frequency Multiplying Circuit", which Application is also incorporated herein for reference purposes and should be reviewed for a good description of the nature of capacitive and inductive circuit elements on the distortion of the RMS current wave form and the resulting inaccuracies that could occur when peak current sampling techniques are employed at the lower current long time and short time overcurrent conditions. RMS current sampling techniques provide an extremely accurate determination of the heating affects on the protected circuit prior to saturation of the current transformer core while peak current sampling techniques provide an accurate representation of the heating affects after the current transformer core has become saturated.

The purpose of this invention is to provide means for determining the occurrence of current transformer core saturation and for instructing the digital processor within an electronic circuit interruption device to time out the shortest pre-selected time delay before initiating circuit interruption procedures.

SUMMARY OF THE INVENTION

The invention comprises an electronic circuit interruption device that employs magnetic core current transformers for sensing current within a protected circuit and a digital processor for determining the occurrence of an overcurrent condition and for interrupting current through the circuit after predetermined time delays. The circuit further includes analog circuit means for determining the onset of current transformer core saturation and for instructing the digital processor to time out the shortest pre-selected time delay prior to interrupting the circuit.

BRIEF DESCRIPTION OF THE DRAWINGS

FIG. 6 a flow diagram representation of the time overcurrent algorithm depicted within the flow diagram representation of FIG. 4.

DESCRIPTION OF THE PREFERRED EMBODIMENT

Figure 1:
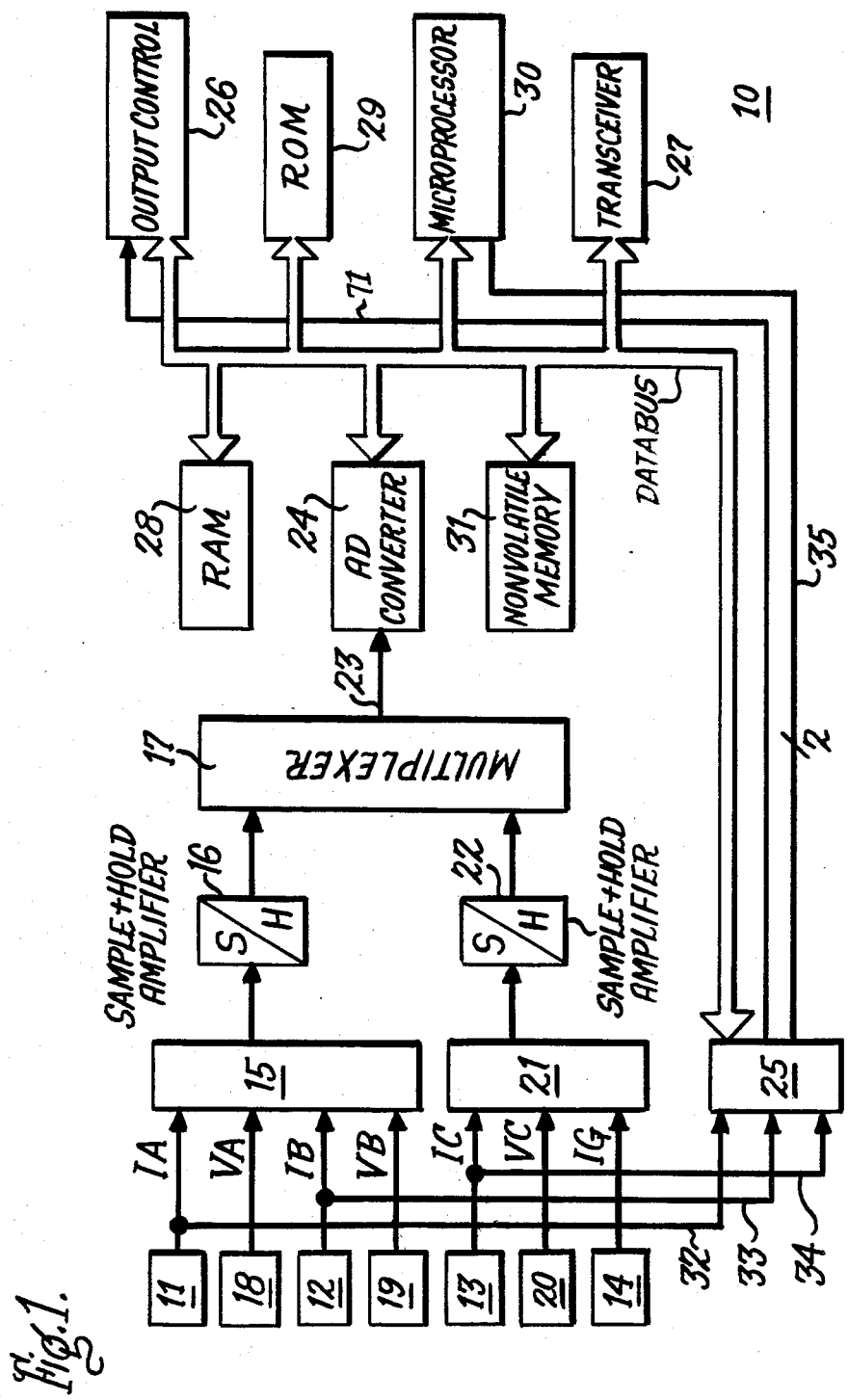
FIG. 1 is a schematic representation of an electronic circuit interruption device employing a digital signal processor in combination with the current transformer saturation detection circuit according to the invention.
Figure 2:
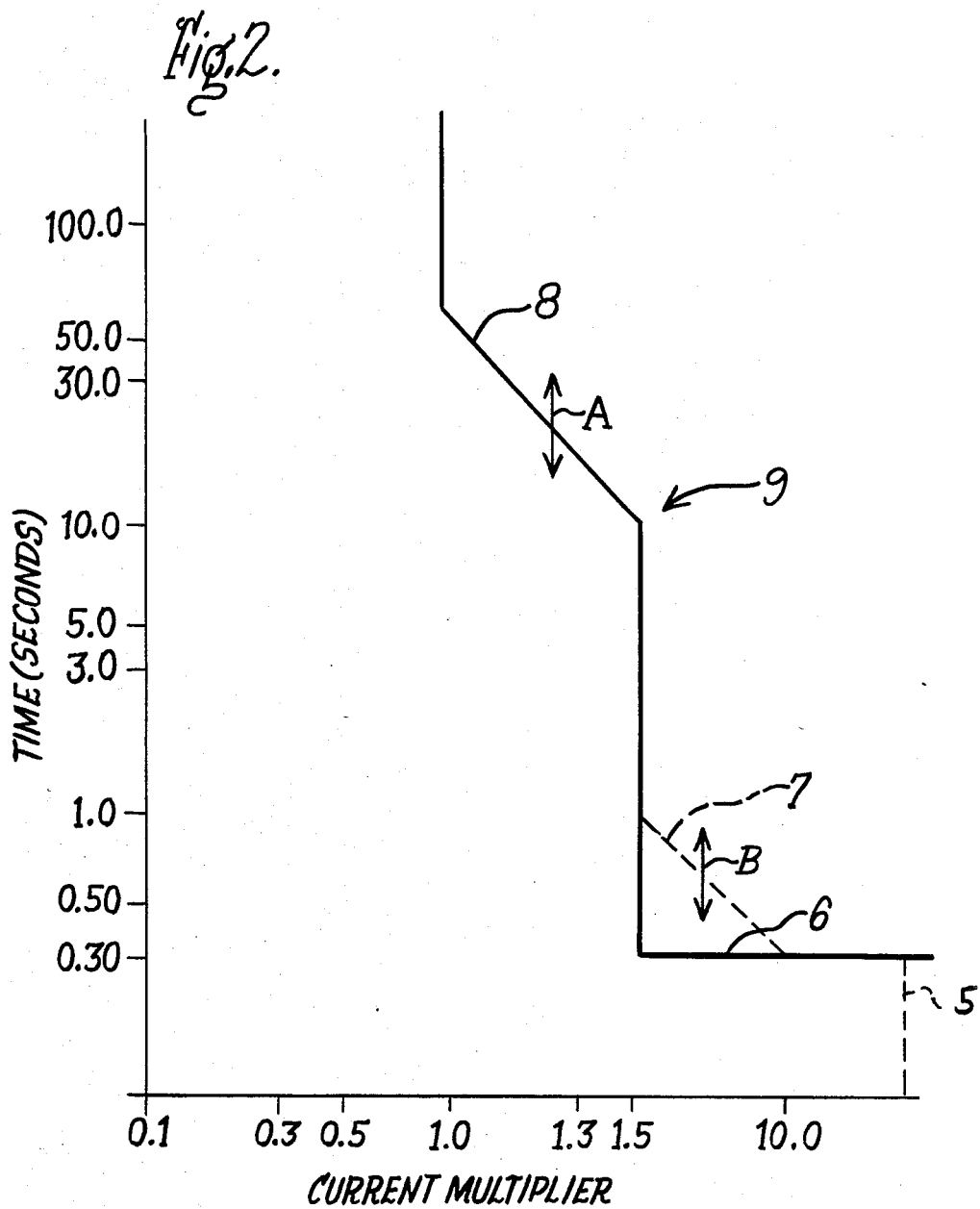
FIG. 2 is a graphic representation of the timeovercurrent parameters used within the digital processor of FIG. 1.

A circuit breaker controller 10 similar to that described within the aforementioned U.S. patent application entitled "Circuit Breaker And Protective Relay Unit" is shown in FIG. 1 wherein current transformers 11–13 sampling each phase of a 3-phase industrial power circuit and a ground fault current transformer 14 are inputted through a pair of multiplexers 15, 21 and sample and hold amplifiers 16, 22 to a dual multiplexer 17 for digitizing within an A-D converter 24 over line 23. The A-D converter inputs to a microprocessor 30 over a data bus to which are connected an output control circuit 26 for operating the circuit interruption mechanism, a RAM 28 for providing temporary storage of the inputted data and a ROM 29 for storing the algorithms for time-overcurrent comparison. A transceiver 27 connects the individual microprocessor 30 with a plurality of similar circuit breaker controllers each having their own separate microprocessor for zone selective interlock function throughout the industrial power delivery circuit. A nonvolatile memory 31 inputs preselected timeovercurrent set points to the microprocessor in accordance with customized options selected by the individual user. Potential transformers 18-20 are connected within each of the 3 separate phases to provide voltage data to the microprocessor in a similar manner for metering and power calculation facility. The current transformer core saturation sensing circuit 25 of the invention, hereafter "sensing circuit," connects directly with each of the 3-phase current transformers 11-13 by means of conductors 32-34, as well as directly with the data bus. Connection is made with an input to the microprocessor 30 over dual conductor line 35 and with output control 26 over line 71. Before describing the operation of the sensing circuit 25 it is helpful to refer to the timeovercurrent trip data representation 9 depicted in FIG. 2. A good explanation for the long time region 8, short time ramp 7 shown in-dashed lines and short time planar region 6 is found within U.S. patent application Ser. No. 760,224, filed July 29, 1985 and entitled "Electronic Circuit Breaker Trip Function Adjusting Circuit". This Application is incorporated herein for purposes of reference. The time overcurrent trip curve 20 provides a plurality of time values represented as long time bands A and short time bands B as described within the aforementioned application. For purposes of this disclosure, the short time region extends to approximately 10 times rated current through the protected circuit and is termed the 1OX region of the circuit breaker trip setting. As described earlier, the current transformers such as 11-14 in FIG. 1, begin to saturate at approximately 10 times the rated current or at the end of the 1OX region of the trip curve. The detection circuit 25 is designed to interrupt the current sampling algorithms within microprocessor 30 when the sensed current reaches the 1OX region to enable the microprocessor to begin timing out the short time delay stored within the nonvolatile memory 31. The instantaneous trip region 5 is indicated in dashed lines at approximately 15X.

Figure 3:
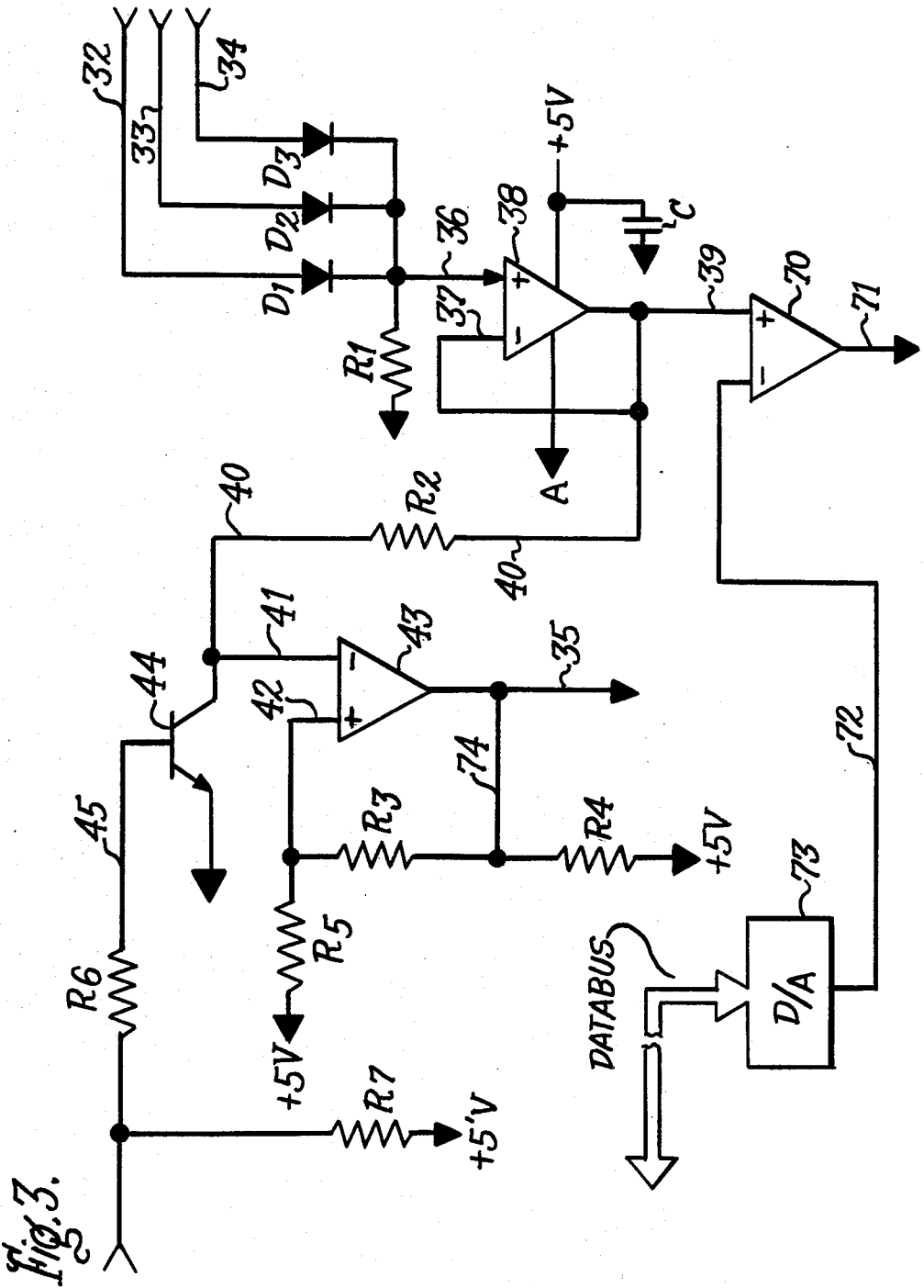
FIG. 3 is a schematic representation of the electronic components within the current transformer saturation detection circuit of FIG. 1.

The components within the detection circuit 25 are depicted in FIG. 3 wherein conductors 32-34 are connected to one input 36 of an operational amplifier 38 through linear diodes $D_1$-$D_3$. The highest peak current occurring on conductors 32-34 is seen at the input of the operational amplifier which is connected as a non-inverting unity gain buffer by means of feedback conductor 37. Input 36 is connected to ground through a pulldown resistor $R_1$ to provide adequate signal input to the operational amplifier. Filter capacitor C prevents spurious signals from interferring with the output signal occurring on line 39 which is connected to the test input of a comparator 70 which is provided as an instantaneous trip option. The comparator reference input is connected over conductor 72 to the data bus through a D/A converter 73 for receiving instantaneous trip set point values for comparing with the signal over line 39 and for producing an output trip signal on conductor 71 which connects directly with the output control circuit 26, as shown in FIG. 1, to trip the breaker. The signal appearing on line 39 is connected to the test input of a second comparator 43 over lines 40 and 41 through current limiting resistor $R_2$. The reference input of the second comparator is connected over line 42 to a 5 volt source through bias resistor $R_5$ and to a second 5 volt source through bias resistors $R_3$, $R_4$. The midpoint of resistors $R_3$, $R_4$ is connected over conductor 74 to the output of the second comparator which provides an output over dual conductor line 35 back to the microprocessor when the input on line 41 exceeds the reference value supplied to the reference input. Resistors $R_3$-$R_5$ are arranged to provide hysterises to the second comparator to ensure that the comparator does not oscillate when the voltages at both inputs are equal. The purpose of the second comparator 43 is to override the current sampling algorithm within the microprocessor 30 when the voltage applied to the test input exceeds the reference voltage which represents 1OX the rated circuit current and is the current at which the current transformer cores begin to saturate. Upon receipt of an interrupt signal over dual conductor line 35, the microprocessor immediately utilizes a predetermined largest current value for determining overcurrent pickup and begins to time out the short time delay interval for tripping the breaker should the overcurrent condition persist for the duration of the short time delay value. An output signal is transmitted from the microprocessor over dual conductor line 35 through a current limiting resistor $R_6$ to the base of a bipolar transistor 44 which is emitter-connected to ground. The collector of the transistor is connected to the test input of the second comparator and to the output of the operational amplifier through current limiting resistor $R_2$ over line 40. When the operational amplifier input current signal over line 36 exceeds 15X rated current which is indicative of a short circuit fault, the output over line 39 then exceeds the instantaneous trip reference value supplied to the reference input from the A/D converter on line 72 and the comparator 70 produces a trip signal output on line 71 to immediately interrupt the circuit.

Figure 4:
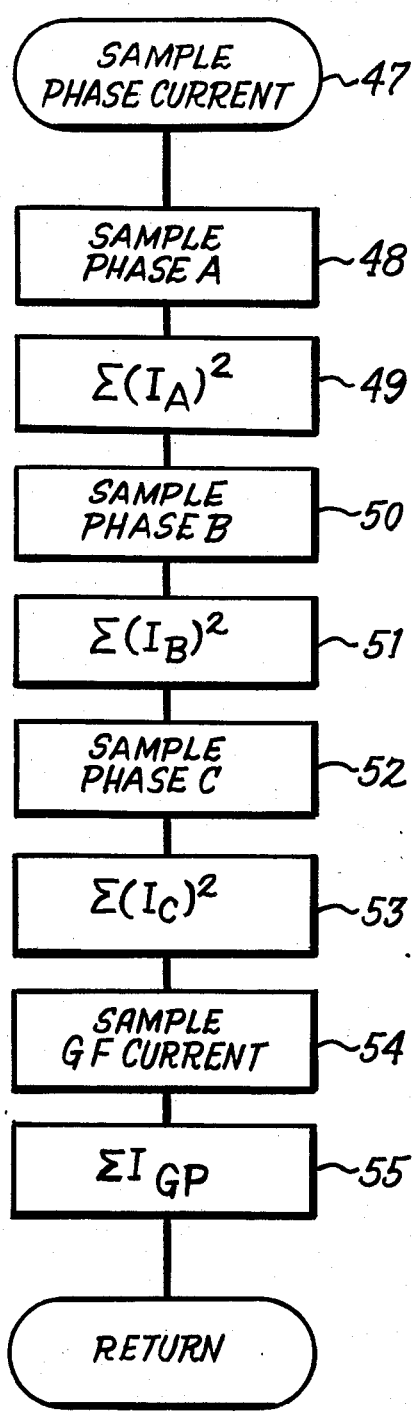
FIG. 4 a flow diagram representation of the RMS sampling algorithms employed within the digital processor depicted in FIG. 1.
Figure 5:
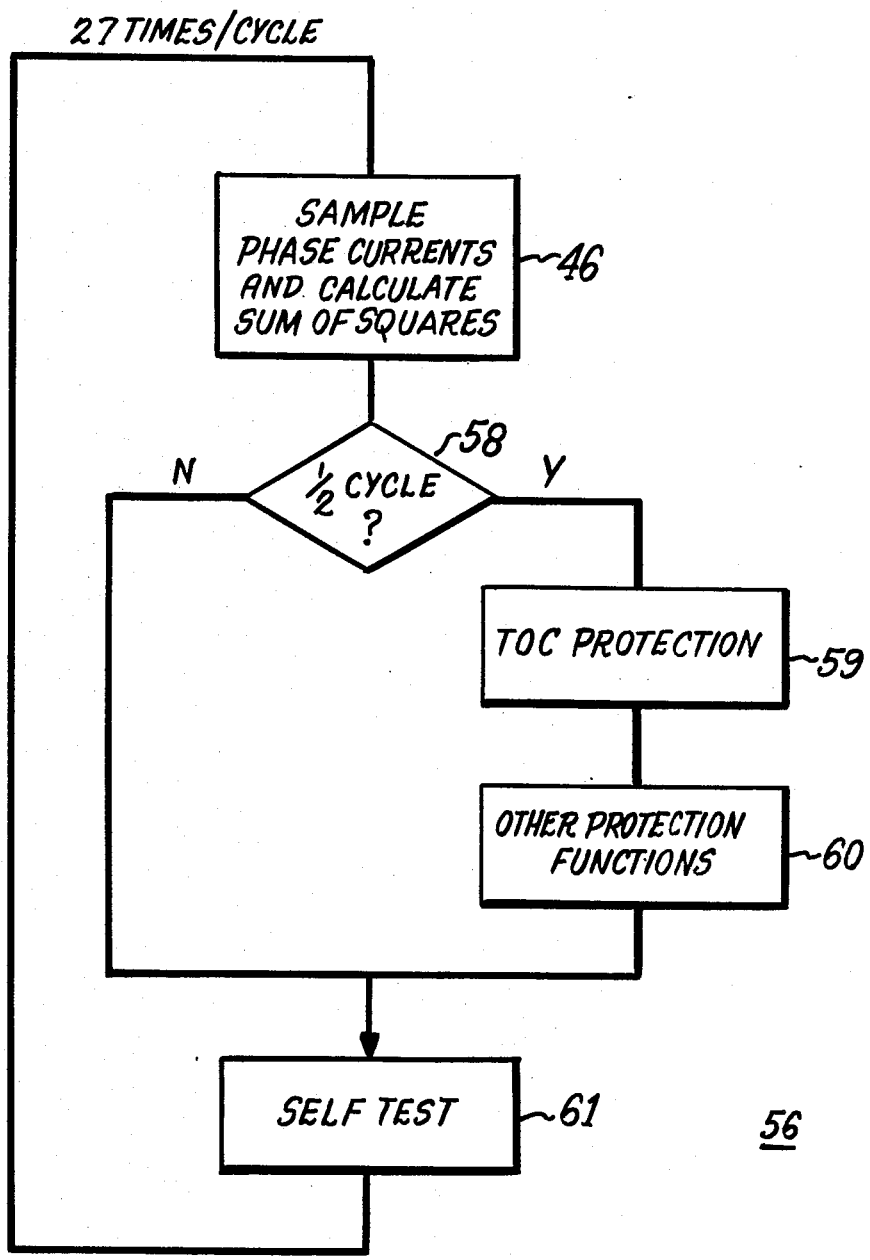
FIG. 5 is a flow diagram representation of the overcurrent protection algorithms employed within the digital processor depicted in FIG. 1.

The RMS sampling algorithms for the microprocessor are depicted in the flow diagram 46 shown in FIG. 4 wherein the phase currents A, B, C are continuously sampled (47) by sampling phase A currents (48) and summing the square of the phase A currents (49). The phase B currents are sampled (50) and the sum of the squares of the phase B currents are determined (51). The phase C currents are sampled (52) and the sum of the squares of the phase C currents are determined (53). The ground fault current is sampled (54) and the sum of the ground fault currents is determined (55). These currents are sampled 27 times per cycle and a determination is made by the overcurrent algorithm flow diagram 56 shown in FIG. 5 after sampling (46) as to whether a half-cycle has transpired (58). If a half-cycle has not transpired the microprocessor performs a self-test algorithm (61). If a half-cycle has transpired, the microprocessor performs the time-overcurrent protection algorithms (59) and other protection functions (60) as indicated. The current transformer saturation algorithm is depicted in the flow diagram (57) shown in FIG. 6 and operates as follows. After performing the time overcurrent protection algorithm (59), a determination is made as to whether the current transformer saturation flag is set (62) and if not, the maximum current utilized by the microprocessor is the largest actual phase current (63). If the current transformer saturation flag is set, the microprocessor utilizes the maximum current as the predetermined largest possible current (64) for the overcurrent determination. The RMS value is calculated (65) and a determination is made as to whether the RMS value of current exceeds short time pickup and, if so, the RMS short time delay is applied (67). If the RMS value of current does not exceed short time pickup values, a determination is made as to whether the RMS current exceeds the long time pickup (68) and, if so, the long time RMS delay values are applied (69).

It is thus seen from the operation of the detection circuit 25 shown in FIGS. 1 and 3, that accurate timeovercurrent determinations can be made within the microprocessor by extremely accurate RMS current values to avoid false tripping effects at long time and short time pick up values. The onset of the saturation of the current transformer cores is sensed and the microprocessor is instructed to apply the interrupt time delays predetermined for short time-overcurrent conditions. In the event that the circuit interrupter is provided with instantaneous overcurrent optional circuitry, the peak current is used for determining the presence of an instantaneous overcurrent condition and the breaker is directly tripped without awaiting instructions from the microprocessor.

What we claim as new and desire to secure by Letters Patent is as follows:

1. An electronic circuit interrupter comprising:
   current sensing means determining RMS electric current magnitudes within a protected circuit said current sensing means comprising current transformers; said current sensing means comprising current transformers;
   output control circuit means connected within said protected circuit interrupting said protected circuit upon command;
   digital signal processor means connected with said current sensing means comparing said current magnitudes to stored predetermined overcurrent values and connected with said output control circuit means to interrupt said protected circuit when said current magnitudes exceed said stored predetermined overcurrent values for predetermined periods of time, said digital signal processor operating on first values of said current magnitudes up to a first level and operating on second values of said current magnitudes at a second level in excess of said first level; and a peak current sensing circuit connected with said current transformers and said output control circuit means to determine peak overcurrent values in excess of said second level, said peak current sensing means being connected to one input or an operational amplifier connected as a buffer
   a first comparator input connected with an output from said buffer and with said digital signal processor comparing said buffer output with a peak reference value from said digital signal processor and outputting a trip signal when said buffer output exceeds said peak reference value;
   a second comparator input connected with said buffer output comparing said buffer output to a core saturation reference value for said current transformers and outputting an interrupt signal to said digital signal processor when said buffer output exceeds said core saturation reference value; and
   said second comparator outputting an interrupt signal to said digital signal processor when said buffer output exceeds said core saturation reference value thereby providing said digital signal processor with indication that said current transformer cores have become saturated.

2. The electronic circuit interrupter of claim 1 wherein said second level comprises said core saturation reference level.

3. An electronic circuit interrupter comprising:
   current sensing means determining RMS electric current magnitudes within a protected circuit, said current sensing means comprising current transformers;
   output control circuit means connected within said protected circuit interrupting said protected circuit upon command;
   signal processor means connected with said current sensing means comparing said current magnitudes to stored predetermined overcurrent values and connected with said output control circuit means to interrupt said protected circuit when said current magnitudes exceed said stored predetermined overcurrent values for predetermined periods of time, said signal process operating on first values of said current magnitudes up to a first level and operation on second values of said current magnitudes at a second level in excess of said first level;
   a peak current sensing circuit connected with said current transformer and said output control means to determine peak overcurrent values in excess of said second level and to interrupt said protected circuit when said peak overcurrent values exceed said second level, said peak current sensing means including three linear diodes, one for each phase of a three-phase circuit, the outputs of said three diodes being connected to one input of an operational amplifier connected as a buffer;
   a first comparator input connected with an output from said buffer and with said signal processor comparing said buffer output with a peak reference value from said signal processor and outputting a trip signal when said buffer output exceeds said peak reference value;
   a second comparator input connected with said buffer output comparing said buffer output to a core saturation reference value for said current transformers and outputting an interrupt signal to said signal processor when said buffer output exceeds said core saturation reference value, said second comparator outputs an interrupt signal to said signal processor when said buffer output exceeds said core saturation reference value thereby providing said signal processor with indication that said current transformer cores have become saturated; and
   a transistor collector connected in common with said buffer output and said second comparator input and emitter-connected to ground, a base on said transistor being connected with said signal processor whereby said signal processor provides base drive to said transistor to turn on said transistor and remove said interrupt signal output from said second comparator.

* * * * *